United States Patent
Bietto et al.

(10) Patent No.: US 9,702,555 B2
(45) Date of Patent: Jul. 11, 2017

(54) EQUIPMENT AND METHOD FOR FURNACE VISUALIZATION USING VIRTUAL INTERACTIVE WINDOWS

(71) Applicant: Honeywell International, Inc., Morristown, NJ (US)

(72) Inventors: Stefano Bietto, Tulsa, OK (US); Matthew Martin, Tulsa, OK (US); Kurt Kraus, Tulsa, OK (US)

(73) Assignee: Honeywell International Inc., Morris Plains, NJ (US)

( * ) Notice: Subject to any disclaimer, the term of this patent is extended or adjusted under 35 U.S.C. 154(b) by 541 days.

(21) Appl. No.: 14/508,405

(22) Filed: Oct. 7, 2014

(65) Prior Publication Data

US 2016/0097533 A1 Apr. 7, 2016

(51) Int. Cl.
  *F23N 5/00* (2006.01)
  *H04N 5/225* (2006.01)
  *F23N 5/08* (2006.01)

(52) U.S. Cl.
  CPC .............. *F23N 5/003* (2013.01); *F23N 5/082* (2013.01); *F23N 2023/08* (2013.01); *F23N 2029/20* (2013.01); *H04N 2005/2255* (2013.01)

(58) Field of Classification Search
  CPC ...... F23N 5/082; F23N 5/003; F23N 2023/08; F23N 2029/20; H04N 5/225; H04N 2005/2255
  See application file for complete search history.

(56) References Cited

U.S. PATENT DOCUMENTS

| | | | |
|---|---|---|---|
| 4,737,844 A | 4/1988 | Kohola et al. | |
| 5,249,954 A | 10/1993 | Allen et al. | |
| 8,070,482 B2 | 12/2011 | Fuentes et al. | |
| 2005/0266363 A1 | 12/2005 | Ganeshan | |
| 2007/0278385 A1* | 12/2007 | Spector | G02B 21/365 250/208.1 |
| 2010/0151397 A1 | 6/2010 | Farrell et al. | |

(Continued)

FOREIGN PATENT DOCUMENTS

| | | |
|---|---|---|
| CN | 1335462 A | 2/2002 |
| CN | 1120956 C | 9/2003 |

(Continued)

OTHER PUBLICATIONS

EBNER Industrieofenbau GmbH, "Tablet to Go Visual Furnaces", HICON: The EBNER Customer Journal (2014), 22(1), 1-24.

(Continued)

*Primary Examiner* — Huy T Nguyen

(57) ABSTRACT

A process is provided for analyzing and visualizing conditions of a combustion process in an enclosure, and includes steps of providing continuously updated images of the enclosure for visualization of the enclosure to a user, using a viewing device having a display representing a virtual window of the enclosure; detecting a viewing angle and a viewing position of the user relative to the enclosure; illustrating an interior prospect of the enclosure relative to the viewing angle and position of the user based on the images of the enclosure; and adjusting, in realtime, the illustration of the interior prospect of the enclosure as at least one of the viewing angle and position of the user is changed for reflecting a changed view of the user.

20 Claims, 3 Drawing Sheets

(56) References Cited

U.S. PATENT DOCUMENTS

2013/0302738 A1 11/2013 Rennie et al.
2014/0076209 A1 3/2014 Benum et al.

FOREIGN PATENT DOCUMENTS

| CN | 1148531 C | 5/2004 |
|---|---|---|
| CN | 102506444 A | 6/2012 |
| CN | 101806548 B | 7/2012 |
| CN | 102945025 A | 2/2013 |
| CN | 103162309 A | 6/2013 |
| CN | 103388833 A | 11/2013 |
| EP | 1493020 B1 | 6/2006 |

OTHER PUBLICATIONS

Moreira et al., "Bringing wireless video into networked multimedia systems", Displays (1997), 17(3-4), 207-215.

\* cited by examiner

EQUIPMENT AND METHOD FOR FURNACE VISUALIZATION USING VIRTUAL INTERACTIVE WINDOWS

The present invention relates generally to a process for analyzing conditions of a combustion process, and more particularly to a process for an accurate visualization and analysis of the conditions of the combustion process of a furnace enclosure using virtual interactive windows and combustion parameters.

BACKGROUND OF THE INVENTION

Accurately analyzing internal conditions of a furnace is an essential task for an operator to better control temperatures of different regions in a furnace enclosure for producing products more efficiently and saving energy-related costs. Typically, image-capturing devices, such as color cameras, infrared spectrometers, filtered cameras, and the like, are installed in the furnace enclosure for detecting the temperatures of the furnace enclosure. Intensities of image pixels received from the devices have a direct relationship with the temperatures of viewed surfaces inside the furnace. Similarly, multi-spectral cameras have been used to detect the temperature of a flame and gas species.

A certain method of video-based technology provides color or intensity images to the operator allowing the operator to manually interpret the state of the combustion process based on the images. An exemplary intensity-temperature calibration and transformation are disclosed in commonly assigned U.S. patent application Ser. No. 14/306,063, which is incorporated by reference in its entirety. Another technology performs off-line intensity-temperature calibration and maps each color image to a specific temperature image, thereby providing a two-dimensional (2D) projection of the temperature and/or radiance field. Other technologies, such as laser, and acoustic, offer three-dimensional (3D) temperature and/or radiance field estimation at specific locations inside the furnace enclosure. However, a number of required sensors, a related cost, and a complicated installation often make such systems impractical in a large scale enclosure. An exemplary 3D temperature and/or radiance field estimation system and method are disclosed in commonly assigned U.S. patent application Ser. No. 14/296,265, and U.S. patent application Ser. No. 14/296,286, which are incorporated by reference in their entirety.

The 3D visualization of the operation inside the furnace enclosure in a refining and petrochemical industry has been a difficult task. Conventionally, small viewports on a side of the furnace are used by furnace operators to look inside the furnace for a visual assessment of the operation. Each viewport typically provides a limited field of view, and thus some internal regions of the furnace are not clearly visible from the side viewport.

Moreover, temperatures of the internal regions of the furnace are extremely high adjacent the viewports, and thus it may be undesirable to stand close to the viewports for the operators. In certain cases, the operators commonly experience heat exhaustion and minor skin burns while standing near the viewports for visual assessment of the combustion process. Due to this exceptionally uncomfortable and undesirable experience of being close to the viewports, the operators often make a hasty interpretation of what has been viewed through the viewports, thereby causing inaccurate assessment of the combustion process.

Another technology for video-based, three-dimensional temperature and/or radiance field estimation applies thermal radiation transfer equations to the temperature images. However, this method is inefficient and inaccurate, and does not provide a required resolution and accuracy due to complex, iterative computations required to resolve unknown temperature and radiance fields in the enclosure. Another reason for the inaccuracy is attributed to poor-quality images caused by incorrect or limited controls of the image-capturing devices. Achieving an acceptable accuracy in high resolution and accurate alignment of the images along with information about a physical structure of the enclosure is essential. Further, relative positions of the image-capturing devices and imaging areas, such as enclosure walls, often shift their alignments and thus cause significant errors.

Therefore, there is a need for an improved method of analyzing conditions of the combustion process in the enclosure without generating substantial errors or variations during operation. Further, the accurate analysis of the furnace conditions provides the operator a better tool to improve the efficiency of the furnace enclosure.

BRIEF SUMMARY OF THE INVENTION

The present invention is directed to a process for analyzing and visualizing conditions of a combustion process in a furnace enclosure based on a virtual realtime illustration of the enclosure. A realtime visualization of an interior prospect of the enclosure is provided in a very flexible and intuitive way without causing substantial reading errors or measurement variations during the combustion process. Such visualization is performed as if an operator is actually looking into an interior of the enclosure from a current position of the operator at that point in time. For example, the interior images provide information and data about the enclosure temperature, pressure, combustion parameters, burner types, and the like. The image type is selectable by the operator based on the temperature field, flame visualization, and other suitable criteria. The images are updated concurrently and continuously as needed.

An important feature of certain embodiments is that the present process provides a realtime visualization of the enclosure to the operator using a viewing device. In practice, the present process may be applied to any combustion enclosure, whose flames are generated by, for example, premix, diffusion mix, solid fuel, liquid fuel, and gaseous fuel used in industrial, residential, commercial, or power burners, flares, or thermal oxidizers. It is also contemplated that the present process may be used to validate and/or optimize indications resulting from computational models of physical systems. Specifically, in certain embodiments, the present process observes a physical enclosure, and corresponding computational model input parameters are adjusted to conform to the physical observations.

In one embodiment, a process is provided for analyzing and visualizing conditions of a combustion process in an enclosure, and includes steps of: providing continuously updated images of the enclosure for visualization of the enclosure to a user, using a viewing device having a display representing a virtual window of the enclosure; detecting a viewing angle and a viewing position of the user relative to the enclosure; illustrating an interior prospect of the enclosure relative to the viewing angle and position of the user based on the images of the enclosure; and adjusting, in realtime, the illustration of the interior prospect of the enclosure as at least one of the viewing angle and position of the user is changed for reflecting a changed view of the user. It is further contemplated that the process also includes performing an analysis of the conditions of the combustion process based on the illustration of the interior prospect of the enclosure in realtime.

In another embodiment, an apparatus is provided for analyzing and visualizing conditions of a combustion process in an enclosure, and includes a visualization unit configured for: providing continuously updated images of the enclosure for visualization of the enclosure to a user, using a viewing device having a display representing a virtual window of the enclosure; detecting a viewing angle and a viewing position of the user relative to the enclosure; illustrating an interior prospect of the enclosure relative to the viewing angle and position of the user based on the images of the enclosure; and, adjusting, in realtime, the illustration of the interior prospect of the enclosure as at least one of the viewing angle and position of the user is changed for reflecting a changed view of the user. It is further contemplated that the visualization unit is further configured for performing an analysis of the conditions of the combustion process based on the illustration of the interior prospect of the enclosure in realtime.

In yet another embodiment, a non-transitory computer-readable medium is provided for storing instructions executable by a computer processor to analyze and visualize conditions of a combustion process in an enclosure. The medium includes instructions to: provide continuously updated images of the enclosure for visualization of the enclosure to a user, using a viewing device having a display representing a virtual window of the enclosure; detect a viewing angle and a viewing position of the user relative to the enclosure; illustrate an interior prospect of the enclosure relative to the viewing angle and position of the user based on the images of the enclosure; and adjust, in realtime, the illustration of the interior prospect of the enclosure as at least one of the viewing angle and position of the user is changed for reflecting a changed view of the user. It is further contemplated that the medium also includes instructions to perform an analysis of the conditions of the combustion process based on the illustration of the interior prospect of the enclosure in realtime.

The foregoing and other aspects and features of the present invention will become apparent to those of reasonable skill in the art from the following detailed description, as considered in conjunction with the accompanying drawings.

DETAILED DESCRIPTION OF THE INVENTION

Figure 1:
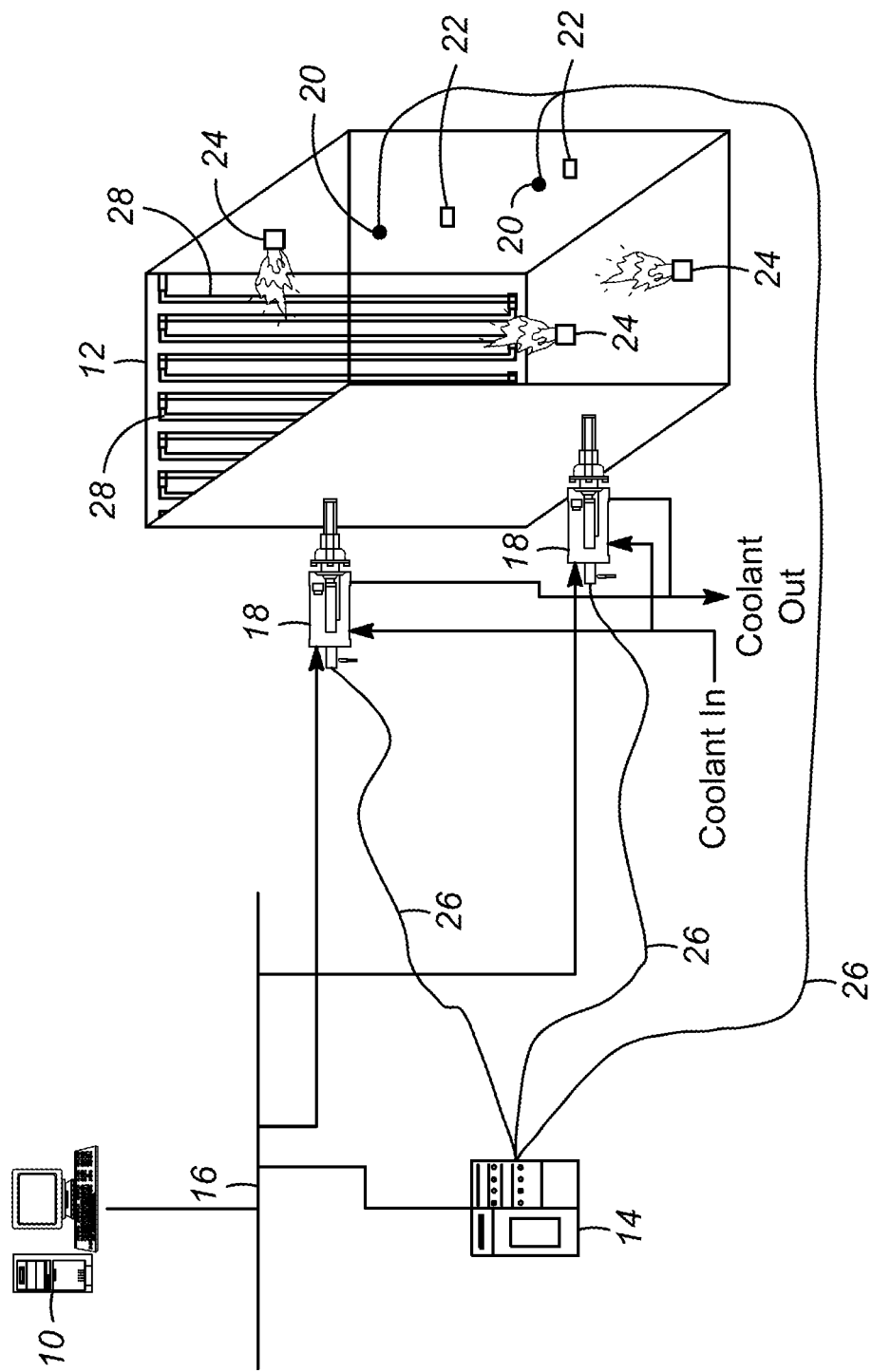
FIG. 1 illustrates an exemplary use of the present process in a camera system configuration.

Referring now to FIG. 1, an exemplary visualization unit 10 using an embodiment of the present process is provided for accurately analyzing conditions of a combustion process inside a large scale enclosure 12, such as an industrial furnace. As used herein, the term "unit" may refer to, be part of, or include an Application Specific Integrated Circuit (ASIC), an electronic circuit, a computer processor (shared, dedicated, or group) and/or memory (shared, dedicated, or group) that executes one or more software or firmware programs, a combinational logic circuit, and/or other suitable components that provide the described functionality. Thus, while this disclosure includes particular examples and arrangements of the units, the scope of the present process should not be so limited since other modifications will become apparent to the skilled practitioner.

The visualization unit 10 is coupled to a server or computing device 14 (including, e.g., a database and video server), and is programmed to perform tasks and display relevant data for different functional units via a network 16. It is contemplated that other suitable networks can be used, such as a corporate Intranet, a local area network (LAN) or a wide area network (WAN), and the like, using dial-in connections, cable modems, high-speed ISDN lines, and other types of communication methods known in the art. All relevant information can be stored in the databases for retrieval by the visualization unit 10 or the computing device 14 (e.g., as a data storage device and/or a machine readable data storage medium carrying computer programs).

A plurality of image-capturing devices 18 are mounted around the enclosure 12 (with two image-capturing devices 18 being shown in this example, but with additional devices being included, if desired). The image-capturing devices 18 have the ability to capture the response in one or multiple parts of the electromagnetic spectrum including visible, ultra-violet, near infrared (NIR), mid wave infrared (MWIR) and long wave infrared (LWIR). The devices 18 can be configured to capture data in specific spectrum bands as required by detection of targeted gas species (e.g., detect presence of carbon monoxide). In addition, the devices 18 can be auto-configured to detect a specific range of temperatures or radiance field. Further, each of the image-capturing devices 18 can be individually configured for a specific spectrum band to increase the efficiency of the system and enable detection of multiple gas species in one or different regions of the enclosure 12. Each image-capturing device 18 can be liquid-cooled by directing the inflow of cold coolant $Coolant_{IN}$ to the device, and delivering the outflow of warm coolant $Coolant_{OUT}$ from device to an outlet.

Each of the image-capturing devices 18 captures image sequences covering a selected interior portion or region of the enclosure 12, for which a temperature-radiance field and gas species field are to be estimated. A plurality of temperature sensors 20, such as thermal couples or pyrometers, which are each observable by one or more image-capturing devices 18, are placed inside the enclosure 12. Optional markers 22, which are within a field of view (FOV) of the image-capturing devices 18, may also be placed inside the enclosure 12.

Other sensors and measuring instruments, such as a gas analyzer and a pressure transducer, are also contemplated to suit different applications. For example, an actuator is installed for an air damper associated with a burner 24, and a mechanical gas valve is disposed on an individual burner gas line associated with the burner 24. Although three burners 24 are shown, any number of burners 24 are disposed and distributed throughout the enclosure 12. The other sensors and measuring instruments send signals to the visualization unit 10, and the visualization unit 10 evaluates the received signals for analyzing and visualizing the conditions of the combustion process.

Cables 26 (or other signal transferring means, such as wireless communication) connect the image-capturing devices 18 and the temperature sensors 20 to the computing device 14, which may also have digitization, storage, and user interface capabilities. The computing device 14 receives temperature outputs or signals from the temperature sensors 20 and image sequences from the image-capturing devices 18 to set proper parameters of the image-capturing devices for performing subsequent calibration, registration and estimating temperature-radiance field of the selected region.

It is an important task for an operator to optimally set the parameters related to the combustion process for maximum product yield, maximum energy efficiency, and minimum fuel gas consumed. Often, the operator selectively controls the combustion process based on a visual estimation of a state of the process at specific locations inside the enclosure 12. Acquiring the states of the process necessitates the knowledge of the three-dimensional temperature and radiance field inside the enclosure 12.

In one embodiment, three-dimensional temperature and radiance fields are computed from a set of images, which are captured by optimally placed image-capturing devices 18 in the enclosure 12. As shown in FIG. 1, the plurality of image-capturing devices 18 are disposed in the enclosure 12, and the plurality of temperature sensors 20 are disposed at selected locations of the enclosure for collecting data. The visualization unit 10 receives the captured images from the image-capturing devices 18, and provides visual feedback of the captured images in a 2D or 3D orientation.

Further, the visualization unit 10 receives the temperature and radiance fields of the selected regions of the enclosure 12 based on the collected data. An exemplary three-dimensional radiance and gas species field estimation method is disclosed in commonly assigned U.S. patent application Ser. No. 14/296,265, which is incorporated by reference in its entirety. Further, an exemplary intensity-temperature transformation of imaging system is disclosed in commonly assigned U.S. patent application Ser. No. 14/296,286, which is incorporated by reference in its entirety.

In a preferred embodiment, the plurality of image-capturing devices 18 are strategically placed in the furnace to provide maximum coverage of the internal view of the enclosure 12. The captured images are sent to the visualization unit 10 in realtime. The images are compiled and combined by the visualization unit 10 to produce a reconstructed 3D field of the interior region or prospect of the enclosure 12. It is contemplated that the visualization unit 10 and the image-capturing devices 18 are communicated wirelessly in realtime, but other suitable communication methods are also contemplated to suit different applications.

Figure 2:
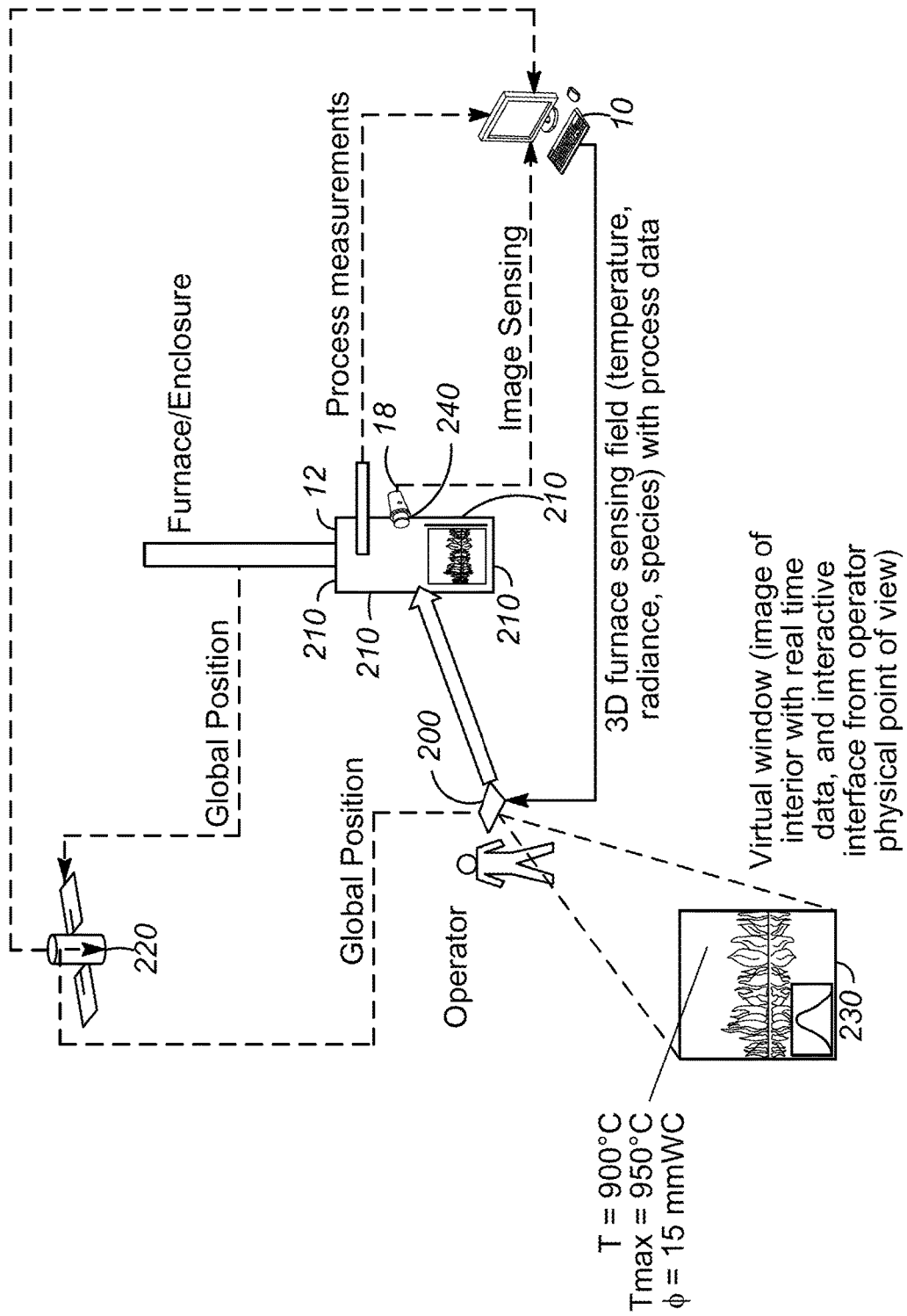
FIG. 2 is a functional block diagram of the present process featuring functional units in accordance with an embodiment of the present disclosure.

Referring now to FIG. 2, a schematic flow diagram of the present apparatus having the visualization unit 10 illustrates its high level processes and the outputs of each process. An exemplary viewing device 200 is shown for viewing the interior prospect of the furnace enclosure 12. Although the visualization unit 10 and the viewing device 200 are separately shown, both can be integrated as a single unit. For example, the visualization unit 10 can include the viewing device 200 as part of the visualization unit 10, or the viewing device 200 can include the visualization unit 10 as an embedded subunit of the viewing device 200. Other suitable configurations of the visualization unit 10 and the viewing device 200 are also contemplated to suit the application. It is preferred that the visualization unit 10 and the viewing device 200 communicate wirelessly in realtime, but other suitable communication methods are also contemplated to suit different applications.

It is contemplated that the viewing device 200 comprises a portable computer tablet, a wearable computer display, or an optical head-mounted display to be used to view the interior prospect of the enclosure 12 from any distance or angle of view. The viewing device 200 performs as a virtual window or virtual cut-out on furnace walls 210 for viewing. Optionally, the furnace walls 210 are displayed as virtually transparent for complete viewing of the enclosure 12. For both cases, such as the virtual window and the transparent furnace wall, a position of the operator is determined relative to a position of the enclosure 12 such that the operator has a realistic feel of the viewing of the interior prospect of the enclosure.

More specifically, a position of the viewing device 200 may be determined based on a location signal received from a global positioning system (GPS) 220, and the location signal is related to a position of the enclosure 12 to provide a virtual window 230 in the operator's point of view using the location signals received from the markers 22. It is contemplated that the images transmitted to the visualization unit 10 are integrated with or overlaid by other relevant visual elements, such as a textual description including furnace-related information, 3D temperature/radiance fields, furnace geometries, operational details, and the like. For example, the images and related textual descriptions are combined and compiled in 3D, using separate windows and buttons for displaying additional information with respect to the conditions of the combustion process.

Another important aspect of the present invention is that as the operator changes a view angle, a position of the viewing device 200, and/or a view distance, the images displayed in the viewing device 200 are automatically adjusted in realtime to reflect the changed view of the operator in the virtual window 230. Thus, this configuration provides a realistic and intuitive viewing experience for the operator via a single viewport, such as the virtual window 230 or the transparent furnace wall 210, without being excessively in proximity with the enclosure 12. Although only one view port 240 is illustrated in FIG. 2, it is contemplated that multiple virtual view ports can be provided to suit different applications so that no blind spots or areas of the enclosure 12 exist for viewing.

Figure 3:
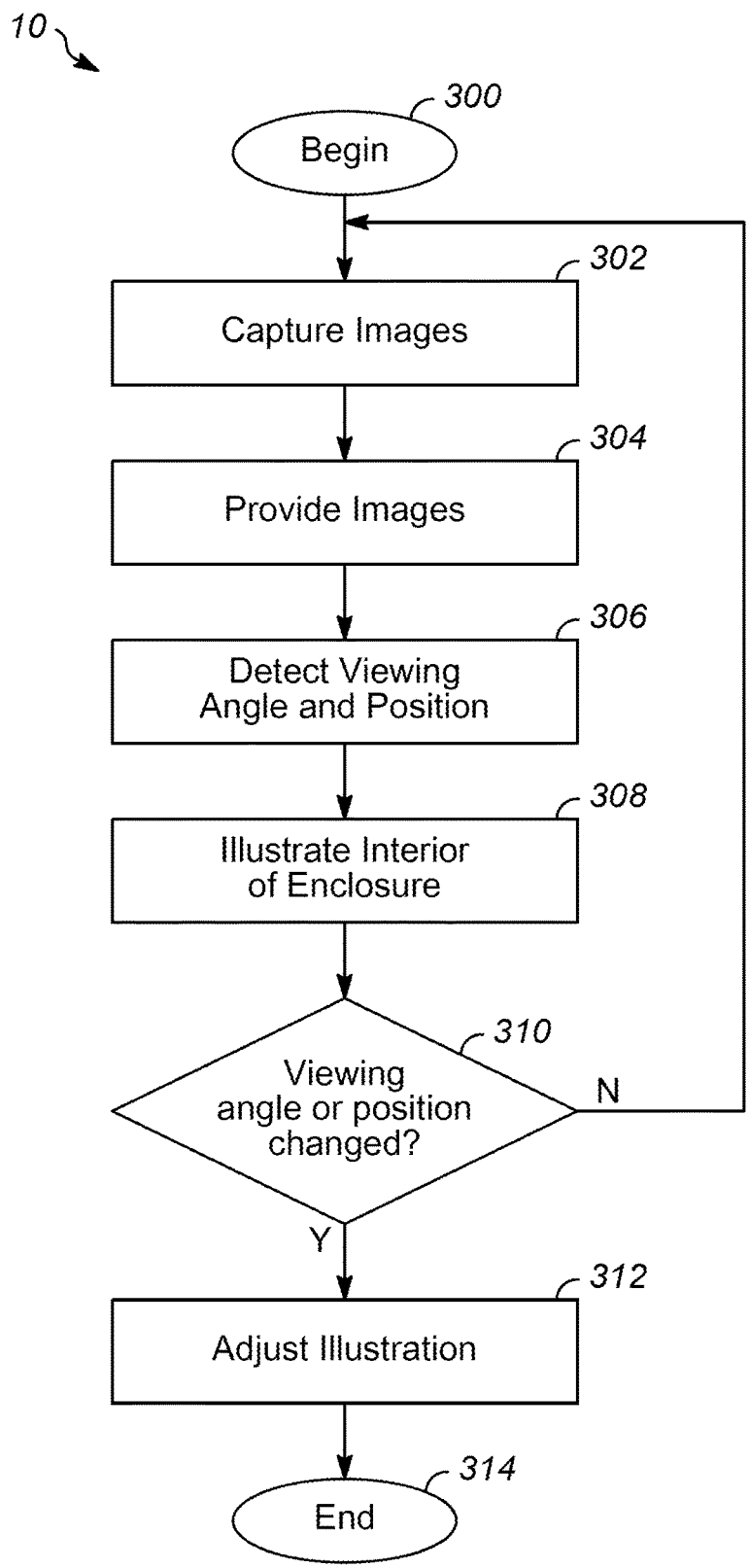
FIG. 3 is a flow chart of the present process illustrating steps in accordance with an embodiment of the present disclosure.

Referring now to FIG. 3, an exemplary flow chart of the present process is shown, illustrating the steps for analyzing and visualizing conditions of the combustion process in the enclosure 12. Although the following steps are primarily described with respect to the embodiment of FIGS. 1 and 2, it should be understood that the steps within the method may be modified and executed in a different order or sequence without altering the principles of the present disclosure.

As shown in FIG. 3, the process begins at step 300. In step 302, the interior images of the enclosure 12 are captured by the plurality of image-capturing devices 18 connected to the enclosure. In step 304, the visualization unit 10 provides continuously updated images of the enclosure 12 for visualization of the enclosure to a user, using a viewing device 200 having a display representing a virtual window of the enclosure. For example, the plurality of image-capturing devices 18 coupled to the visualization unit 10 transmit the images of the interior prospect of the enclosure 12 in realtime. Then, the visualization unit 10 compiles the images received from the plurality of image-capturing devices 18, and constructs a three-dimensional (3D) view of the interior prospect of the enclosure 12 based on the compiled images.

The 3D view of the interior prospect of the enclosure 12 is transmitted wirelessly in realtime to the user.

In step 306, the visualization unit 10 detects a viewing angle and a viewing position of the user relative to the enclosure 12. In step 308, the visualization unit 10 illustrates, using the viewing device 200, an interior prospect of the enclosure 12 relative to the viewing angle and position of the user based on the images of the enclosure. For example, the walls 210 of the enclosure 12 are transformed as virtually transparent for the viewing of the interior prospect of the enclosure.

In step 310, the visualization unit 10 determines whether at least one of: the viewing angle and the viewing position of the user has changed in a predetermined time period relative to the enclosure 12. When the viewing angle or position has changed, control proceeds to step 312. Otherwise, control proceeds to step 302.

In step 312, the visualization unit 10 adjusts, in realtime, the illustration of the interior prospect of the enclosure 12 as at least one of the viewing angle and position of the user is changed for reflecting a changed view of the user. For example, the visualization unit 10 integrates or overlay the illustration of the interior prospect of the enclosure with at least one enclosure parameter for describing the conditions of the combustion process in the enclosure as the viewing angle or position alters. The process ends at step 314.

While a particular embodiment of the present process has been described herein, it will be appreciated by those skilled in the art that changes and modifications may be made thereto without departing from the invention in its broader aspects and as set forth in the following claims.

What is claimed is:

1. A process for analyzing and visualizing conditions of a combustion process in an enclosure, comprising:
   providing continuously updated images of the enclosure for visualization of the enclosure to a user, using a viewing device having a display representing a virtual window of the enclosure;
   detecting a viewing angle and a viewing position of the user relative to the enclosure;
   illustrating an interior prospect of the enclosure relative to the viewing angle and position of the user based on the images of the enclosure; and
   adjusting, in realtime, the illustration of the interior prospect of the enclosure as at least one of the viewing angle and position of the user is changed for reflecting a changed view of the user.

2. The process according to claim 1, further comprising capturing the images of the enclosure using a plurality of image-capturing devices connected to the enclosure.

3. The process according to claim 2, further comprising compiling the images received from the plurality of image-capturing devices, and constructing a three-dimensional (3D) view of the interior prospect of the enclosure based on the compiled images.

4. The process according to claim 3, further comprising transmitting the 3D view of the interior prospect of the enclosure wirelessly in realtime to the user.

5. The process according to claim 1, wherein the viewing device includes at least one of: a portable computer device, a wearable computer display, and an optical head-mounted display for the viewing of the interior prospect of the enclosure.

6. The process according to claim 1, further comprising transforming walls of the enclosure virtually transparent for the viewing of the interior prospect of the enclosure.

7. The process according to claim 1, further comprising integrating the illustration of the interior prospect of the enclosure with at least one enclosure parameter for describing the conditions of the combustion process in the enclosure.

8. An apparatus for analyzing and visualizing conditions of a combustion process in an enclosure, the apparatus comprising:
   a visualization unit configured for providing continuously updated images of the enclosure for visualization of the enclosure to a user, using a viewing device having a display representing a virtual window of the enclosure;
   detecting a viewing angle and a viewing position of the user relative to the enclosure;
   illustrating an interior prospect of the enclosure relative to the viewing angle and position of the user based on the images of the enclosure; and
   adjusting, in realtime, the illustration of the interior prospect of the enclosure as at least one of the viewing angle and position of the user is changed for reflecting a changed view of the user.

9. The apparatus according to claim 8, further comprising a plurality of image-capturing devices connected to the enclosure, the plurality of image-capturing devices configured for capturing the images of the enclosure.

10. The apparatus according to claim 9, wherein the visualization unit is configured for compiling the images received from the plurality of image-capturing devices, and constructing a three-dimensional (3D) view of the interior prospect of the enclosure based on the compiled images.

11. The apparatus according to claim 10, wherein the visualization unit is configured for transmitting the 3D view of the interior prospect of the enclosure wirelessly in realtime to the user.

12. The apparatus according to claim 8, wherein the viewing device includes at least one of: a portable computer device, a wearable computer display, and an optical head-mounted display for the viewing of the interior prospect of the enclosure.

13. The apparatus according to claim 8, wherein the visualization unit is configured for transforming walls of the enclosure virtually transparent for the viewing of the interior prospect of the enclosure.

14. The apparatus according to claim 8, wherein the visualization unit is configured for integrating the illustration of the interior prospect of the enclosure with at least one enclosure parameter for describing the conditions of the combustion process in the enclosure.

15. A non-transitory computer-readable medium storing instructions executable by a computer processor to analyze and visualize conditions of a combustion process in an enclosure, comprising instructions to:
   provide continuously updated images of the enclosure for visualization of the enclosure to a user, using a viewing device having a display representing a virtual window of the enclosure;
   detect a viewing angle and a viewing position of the user relative to the enclosure;
   illustrate an interior prospect of the enclosure relative to the viewing angle and position of the user based on the images of the enclosure; and
   adjust, in realtime, the illustration of the interior prospect of the enclosure as at least one of the viewing angle and position of the user is changed for reflecting a changed view of the user.

16. The medium according to claim 15, further comprising instructions to capture the images of the enclosure using a plurality of image-capturing devices connected to the enclosure.

17. The medium according to claim 16, further comprising instructions to compile the images received from the plurality of image-capturing devices, and construct a three-dimensional (3D) view of the interior prospect of the enclosure based on the compiled images.

18. The medium according to claim 17, further comprising instructions to transmit the 3D view of the interior prospect of the enclosure wirelessly in realtime to the user.

19. The medium according to claim 15, wherein the viewing device includes at least one of: a portable computer device, a wearable computer display, and an optical head-mounted display for the viewing of the interior prospect of the enclosure.

20. The medium according to claim 15, further comprising instructions to transform walls of the enclosure virtually transparent for the viewing of the interior prospect of the enclosure, and integrate the illustration of the interior prospect of the enclosure with at least one enclosure parameter for describing the conditions of the combustion process in the enclosure.

* * * * *